(12) United States Patent
Kim et al.

(10) Patent No.: US 10,253,550 B1
(45) Date of Patent: Apr. 9, 2019

(54) VACUUM INSULATED GLASS UNITS AND METHODOLOGY FOR MANUFACTURING THE SAME

(71) Applicant: Corning Incorporated, Corning, NY (US)

(72) Inventors: Jin Su Kim, Painted Post, NY (US); Aize Li, Painted Post, NY (US); Timothy James Orsley, San Jose, CA (US)

(73) Assignee: CORNING INCORPORATED, Corning, NY (US)

( * ) Notice: Subject to any disclaimer, the term of this patent is extended or adjusted under 35 U.S.C. 154(b) by 103 days.

(21) Appl. No.: 15/336,879

(22) Filed: Oct. 28, 2016

Related U.S. Application Data

(60) Provisional application No. 62/248,715, filed on Oct. 30, 2015.

(51) Int. Cl.
*E06B 3/677* (2006.01)
*E06B 3/673* (2006.01)
(Continued)

(52) U.S. Cl.
CPC ............ *E06B 3/673* (2013.01); *E06B 3/6612* (2013.01); *E06B 3/66304* (2013.01);
(Continued)

(58) Field of Classification Search
CPC ......... C03C 27/10; C03C 15/00; E06B 3/673; E06B 3/677; B44C 1/227
See application file for complete search history.

(56) References Cited

U.S. PATENT DOCUMENTS 5,891,536 A    4/1999  Collins et al.
6,291,036 B1   9/2001  Wang et al.
(Continued)

FOREIGN PATENT DOCUMENTS

CN    104718341 A    6/2015
EP      1571134 A1   9/2005
(Continued)

OTHER PUBLICATIONS

Machine translation of JP 2005-120395 (Year: 2005).*
(Continued)

*Primary Examiner* — Donald J Loney
(74) *Attorney, Agent, or Firm* — Svetlana S. Short

(57) ABSTRACT

A vacuum insulated glass unit includes a first and a second glass pane and a pane bonding layer. The first and second glass panes each include a vacuum chamber side opposite an outer side. The vacuum chamber side of the first glass pane includes an etched interior surface, a glass pane periphery having a periphery surface, and a plurality of glass spacers each having an end surface. The pane bonding layer is positioned between and engaged with the periphery surface of the glass pane periphery of the first glass pane and the second glass pane and couples the first glass pane to the second glass pane. Each end surface of the plurality of glass spacers and the periphery surface of the glass pane periphery are offset from the etched interior surface such that a vacuum chamber is disposed between the first and the second glass panes.

13 Claims, 5 Drawing Sheets

(51) Int. Cl.
*E06B 3/66* (2006.01)
*E06B 3/663* (2006.01)
*C03C 15/00* (2006.01)
*B44C 1/22* (2006.01)
*C03C 27/10* (2006.01)

(52) U.S. Cl.
CPC ........ *E06B 3/66309* (2013.01); *E06B 3/6775* (2013.01); *B44C 1/227* (2013.01); *C03C 15/00* (2013.01); *C03C 27/10* (2013.01); *E06B 3/677* (2013.01)

(56) References Cited

U.S. PATENT DOCUMENTS

| | | |
|---|---|---|
| 6,506,272 B1 | 1/2003 | Aggas |
| 6,701,749 B2 | 3/2004 | Wang et al. |
| 7,097,724 B2 | 8/2006 | Hornung et al. |
| 7,115,308 B2 | 10/2006 | Amari et al. |
| 7,244,480 B2 | 7/2007 | Minaai et al. |
| 8,137,494 B2 | 3/2012 | Cooper et al. |
| 8,377,525 B2 | 2/2013 | Cooper et al. |
| 8,460,493 B2 | 6/2013 | Cooper |
| 8,821,999 B2 | 9/2014 | Grzybowski et al. |
| 2002/0106463 A1 | 8/2002 | Wang |
| 2013/0040079 A1 | 2/2013 | Caliaro et al. |
| 2014/0034218 A1 | 2/2014 | Hogan et al. |
| 2014/0322461 A1 | 10/2014 | Friedl et al. |

FOREIGN PATENT DOCUMENTS

| | | | |
|---|---|---|---|
| JP | 2005-120395 | * | 5/2005 |
| KR | 20110120804 A | | 11/2011 |
| WO | 0063130 A1 | | 10/2000 |
| WO | 2013085480 A1 | | 6/2013 |

OTHER PUBLICATIONS

Lenzen et al., "Thermal outgassing of vacuum glazing", J. Vac. Sci. Technol. A 17, 1002 (1999).

Wang, et al., "Stresses in Vacuum glazing fabricated at low temperature", Solar Energy Materials & Solar Cells 91, pp. 290-303, (2007).

Collins, et al., "Current status of the science and technology of vacuum glazing", Solar Energy 62(3), pp. 189-213, Mar. 1998.

Griffiths et al., "Fabrication of evacuated glazing at low temperature", Solar Energy 63(4), pp. 243-249 (1998).

Simko, T.M., Fischer-Cripps, A.C. Collins, R.E., 1998. Temperature-induced stresses in vacuum glazing: Modelling and experimental validation. Solar Energy 63, 1-21.

* cited by examiner

VACUUM INSULATED GLASS UNITS AND METHODOLOGY FOR MANUFACTURING THE SAME

This application claims the benefit of priority under 35 U.S.C. § 119 of U.S. Provisional Application Ser. No. 62/248,715 filed on Oct. 30, 2015, the content of which is relied upon and incorporated herein by reference in its entirety.

BACKGROUND

The present disclosure relates to vacuum insulated glass units. More specifically, the present disclosure introduces technology for vacuum insulated glass units and vacuum insulated glass units with chemically etched glass spacers and bonded glass panes.

BRIEF SUMMARY

According to the subject matter of the present disclosure, a vacuum insulated glass unit includes a first glass pane, a second glass pane, and a pane bonding layer. In embodiments, the first and second glass panes each include a vacuum chamber side opposite an outer side. In embodiments, the vacuum chamber side of the first glass pane includes an etched interior surface, a glass pane periphery having a periphery surface, and a plurality of glass spacers each having an end surface. In embodiments, the pane bonding layer is positioned between and bonded with the periphery surface of the glass pane periphery of the first glass pane and the vacuum chamber side of the second glass pane, such that the pane bonding layer couples the first glass pane to the second glass pane. In embodiments, each end surface of the plurality of glass spacers and the periphery surface of the glass pane periphery are offset from the etched interior surface such that a vacuum chamber is disposed between the etched interior surface of the first glass pane and the vacuum chamber side of the second glass pane.

In accordance with one embodiment of the present disclosure, a method of manufacturing a vacuum insulated glass unit is disclosed. In embodiments, the method includes depositing a pane bonding layer onto a vacuum chamber side of a first glass pane. In embodiments, the method includes depositing an etching mask layer onto a plurality of masking locations along the vacuum chamber side of the first glass pane such that the pane bonding layer is positioned between the first glass pane and the etching mask layer. In embodiments, the method includes contacting the vacuum chamber side of the first glass pane with a chemical etchant to remove a depth of glass pane material and remove the pane bonding layer from unmasked portions of the vacuum chamber side of the first glass pane, such that the vacuum chamber side of the first glass pane includes an etched interior surface, a glass pane periphery, and a plurality of glass spacers. In embodiments, the plurality of glass spacers and the glass pane periphery extend from the etched interior surface. In embodiments, the pane bonding layer is positioned on the glass pane periphery. In embodiments, the method further includes removing the etching mask layer and bonding a second glass pane with the pane bonding layer positioned on the glass pane periphery of the first glass pane.

In accordance with another embodiment of the present disclosure, a method of manufacturing a vacuum insulated glass unit. In embodiments, the method includes depositing an etching mask layer onto a plurality of masking locations along a vacuum chamber side of a first glass pane. In embodiments, the method includes contacting the vacuum chamber side of the first glass pane with a chemical etchant to remove a depth of glass pane material from unmasked portions of the vacuum chamber side of the first glass pane, such that the vacuum chamber side of the first glass pane includes an etched interior surface, a glass pane periphery, and a plurality of glass spacers. In embodiments, the plurality of glass spacers and the glass pane periphery extend from the etched interior surface. In embodiments, the method includes removing the etching mask layer. In embodiments, the method includes positioning a second glass pane having a low-emissivity layer on a vacuum chamber side of the second glass pane in contact with the glass pane periphery of the first glass pane. In embodiments, the method includes irradiating the low-emissivity layer of the second glass pane contacting the glass pane periphery of the first glass pane with a bonding laser to fuse the low-emissivity layer contacting the glass pane periphery and seal the first glass pane to the second glass pane.

Although the concepts of the present disclosure are described herein with primary reference to some specific vacuum insulated glass unit configurations, it is contemplated that the concepts will enjoy applicability to vacuum insulated glass units having any configuration.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
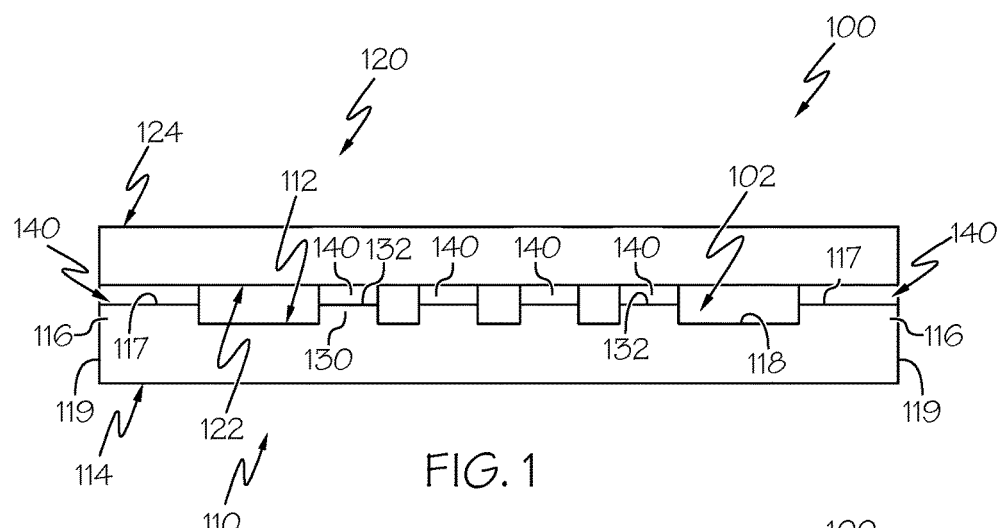
FIG. 1 is a schematic cross-sectional illustration of a vacuum insulated glass unit having a pane bonding layer positioned between a first glass pane and a second glass pane, according to one or more embodiments shown and described herein.

FIG. 1 is a schematic illustration of a vacuum insulated glass unit 100. The vacuum insulated glass unit 100 comprises a first glass pane 110, a second glass pane 120, and a pane bonding layer 140. The first and second glass panes 110, 120 each include a vacuum chamber side 112, 122 opposite an outer side 114, 124. The vacuum chamber side 112 of the first glass pane 110 may comprise an etched interior surface 118, a glass pane periphery 116, and a plurality of glass spacers 130 each comprising an end surface 132. The glass pane periphery 116 may be located along a perimeter 119 of the first glass pane 110 and includes a periphery surface 117. The plurality of glass spacers 130 and the glass pane periphery 116 may extend integrally from the etched interior surface 118. The glass pane periphery 116 may terminate at the periphery surface 117 and the plurality of glass spacers 130 each terminate at the end surface 132. Further, each end surface 132 of the plurality of glass spacers 130 and the periphery surface 117 of the glass pane periphery 116 are offset from the etched interior surface 118 such that a vacuum chamber 102 is disposed between the etched interior surface 118 of the first glass pane 110 and the vacuum chamber side 122 of the second glass pane 120. In embodiments, each end surface of the plurality of glass spacers is substantially flat. In embodiments, each end surface of the plurality of glass spacers has a radius of curvature greater than 2600 microns. In embodiments, the glass pane including the etched surface provides for visible light transmission there thorough within +1-5% transmission of the glass pane before etching.

The pane bonding layer 140 is positioned between and bonded with the periphery surface 117 of the first glass pane 110 and the vacuum chamber side 122 of the second glass pane 120, such that the pane bonding layer 140 couples the first glass pane 110 to the second glass pane 120. The pane bonding layer 140 may also be disposed on the end surfaces 132 of the plurality of glass spacers 130. The pane bonding layer 140 may comprise a low melting point glass, a glass frit, a low-emissivity material (e.g., the material of a low-emissivity layer 144), a metal solder, such as indium solder, an inorganic material, such as, $SnO_2$, $ZnO$, $TiO_2$, ITO, Zn, Ce, Pb, Fe, VA, Cr, Mn, Mg, Ge, $SnF_2$, $ZnF_2$, and combinations thereof. Further, the pane bonding layer 140 may comprise a thickness of between about 0.1 μm and about 300 μm, for example, 1 μm, 3 μm, 5 μm, 10 μm, 15 μm, 25 μm, 50 μm, and for example, between about 0.5 μm and about 100 μm.

The pane bonding layer 140 may be compositionally configured to fuse upon absorption of radiation at wavelengths between about 300 nm and about 1600 nm, for example, between about 750 nm to about 1600 nm, between about 420 nm to about 750 nm, or the like, output by a bonding laser operating at between about 1 W and about 25 W, for example, between about 10 W and about 20 W and bond the first glass pane 110 to the second glass pane 120. Further, a wavelength of absorption or wavelength range of absorption may be predetermined based on the material of the pane bonding layer 140, such that at least about 10% of the laser energy output by the bonding laser is absorbed by the pane bonding layer 140.

The pane bonding layer 140 may also be compositionally configured to bond the first glass pane 110 to the second glass pane 120 upon exposure to ultrasonic energy (e.g., ultrasonic energy between about 10 kHz and about 100 MHz) or upon exposure to heat, such as heat applied by a furnace at a temperature less than or equal to a softening temperature of soda lime glass, for example, between about 250° C. and about 750° C. Further, the pane bonding layer 140 may comprise a softening temperature within a range of temperatures that are at least partially exclusive of a range of softening temperatures of each of the first and second glass panes 110, 120. For example, the pane bonding layer 140 may comprise a softening temperature lower than a softening temperature of the first and second glass panes 110, 120, such that the plug bonding layer 180 may fuse without deforming adjacent portions of the first and second glass pane 110, 120.

The first glass pane 110 and the second glass pane 120 may comprise any glass composition suitable as a vacuum insulated window. For example, the first and second glass panes 110, 120 may comprise soda-lime glass, such as, soda-lime float glass, alumino silicate glass, borosilicate glass, Gorilla® Glass, or the like. The first glass pane 110 and the second glass pane 120 may also comprise tempered glass, such as heat tempered glass, chemically tempered glass, or the like. The first and second glass panes 110 may also comprise any thickness, for example, between about 3 mm and about 12 mm, such as 4 mm, 6 mm, 8 mm, or the like. The first and second glass panes 110, 120 may have the same thickness or may have different thicknesses. For example, when the first glass pane 110 comprises the etched interior surface 118, the thickness of the etched interior surface 118 may be equal to the thickness of the second glass pane 120, for example about 3 mm. Further, before the etched interior surface 118 is etched into the first glass pane 110, the first glass pane 110 may be thicker than the second glass pane 120. For example, the pre-etched first glass pane 110 may comprise a thickness of about 5 mm and the second glass pane 120 may comprise a thickness of about 3 mm.

Referring still to FIG. 1, the plurality of glass spacers 130 are positioned in a spacer array such that each glass spacer 130 is positioned between about 10 mm and about 100 mm from an adjacent glass spacer, for example, 20 mm, 30 mm, 40 mm, or the like, or between about 10 mm and about 50 mm. It should be understood that any spacer array configuration is contemplated. Further, the end surfaces 132 of the plurality of glass spacers 130 are each offset from the etched interior surface 118, for example, between about 50 μm and about 300 μm, such as between about 80 μm and about 200 μm. Moreover, the end surfaces 132 may comprise a cross sectional diameter or cross sectional length and/or width between about 50 μm and about 300 μm, for example, between about 100 μm and about 200 μm. Alternatively, the plurality of glass spacers 130 may be formed according to the laser-induced methods provided in U.S. Patent Publication 2012/0247063 the entire contents of which is incorporated by reference herein.

In operation, the plurality of glass spacers 130 are structurally configured to maintain separation of the first glass pane 110 and the second glass pane 120 when the vacuum chamber 102 comprises a pressure below atmospheric pressure, for example, after gas is removed from the vacuum chamber 102. In one embodiment, end surface 132 of the plurality of glass spacers 103 etched from first glass pane 110 contact the second glass pane 120 to maintain separation.

The plurality of glass spacers 130 may each comprise a compressive strength of between about 5 MPa and about 50 MPa, such as about 10 MPa, 20 MPa, 25 MPa, 35 MPa, 45 MPa, or the like. At least one of the plurality of glass spacers 130 may comprise a load resistance of 1800 kilograms or more, 2000 kilograms or more, of 3600 kilograms or more, or from about 1800 kilograms to about 3600 kilograms. In embodiments, the load resistance of a glass spacer 130 is confirmed when the glass spacer is not cracked, crushed, or irreversibly deformed by the above disclosed applied load normal to an end surface thereof. When the plurality of glass spacers 130 comprising increased compressive strength (e.g., when both glass panes are heat tempered) or increased load resistance, fewer glass spacers 130 may be needed to maintain separation of the first glass pane 110 and the second glass pane 120, reducing the thermal transmittance across the vacuum insulated glass unit 100. Increasing the compressive strength or load resistance of the plurality of glass spacers 130 may also increase the lifetime of the vacuum insulated glass unit 100. Further, the plurality of glass spacers 130 may comprise a thermal transmittance of between about 0.2 W/mK and about 1.4 W/mK, such as about 0.6 W/mK, about 0.7 W/mK about 1 W/mK, about 1.1 W/mK, or the like. Moreover, the end surfaces 132 of the plurality of glass spacers 130 may each comprise a surface roughness of between about 0.02 μm/20 mm peak-to-peak and about 0.3 μm/20 mm peak-to-peak. For example, the end surfaces 132 of the glass spacers 130 may each comprise a surface roughness equal to a surface roughness of the vacuum chamber side 112, 122 of the first and second glass panes 110, 120.

Figure 2:
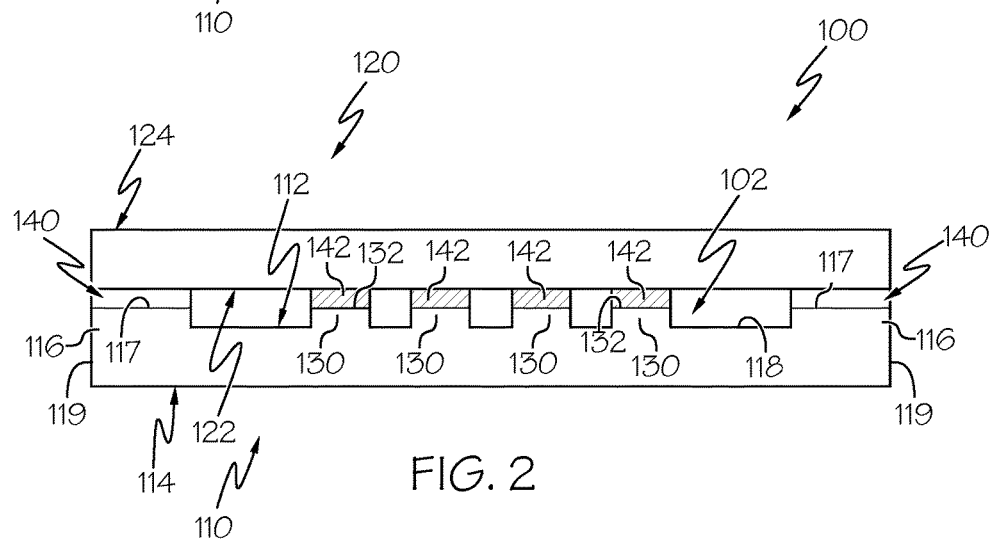
FIG. 2 is a schematic cross-sectional illustration of a vacuum insulated glass unit having an anti-friction layer positioned between a first glass pane and a second glass pane, according to one or more embodiments shown and described herein.

Referring now to FIG. 2, the vacuum insulated glass unit 100 may comprise an anti-friction layer 142 positioned on the end surface 132 of at least one of the plurality of glass spacers 130. The anti-friction layer 142 may be positioned directly on the end surfaces 132 of the plurality of glass spacers 130. Further, the pane bonding layer 140 may be positioned between the end surfaces 132 of the plurality of glass spacers 130 and the anti-friction layer 142 (FIGS. 4E-4G). The anti-friction layer 142 may comprise a transparent or an opaque material, for example, $WS_2$, $MoS_2$, or combinations thereof. Moreover, the anti-friction layer 142 may comprise any material compositionally configured to reduce the friction between glass components, for example, between the end surfaces 132 of the plurality of glass spacers 130 and the vacuum chamber side 122 of the second glass pane 120.

In operation, the vacuum insulated glass unit 100 may be located in variable thermal environments, which may cause thermal expansion and retraction of the vacuum insulated glass unit 100. For example, when the vacuum insulated glass unit 100 is installed in a structure, one of the first or second glass panes 110, 120 may face the interior of the structure and the other of the first or second glass panes 110, 120 may face the exterior environment, creating a thermal gradient which may cause thermal expansion and retraction of the first and second glass panes 110, 120. The anti-friction layer 142 may reduce or prevent damage to the first and/or second glass panes 110, 120 caused by the relative motion of the glass spacers 130 along the vacuum chamber side 122 of the second glass pane 120 due to thermal expansion and retraction.

Figure 3:
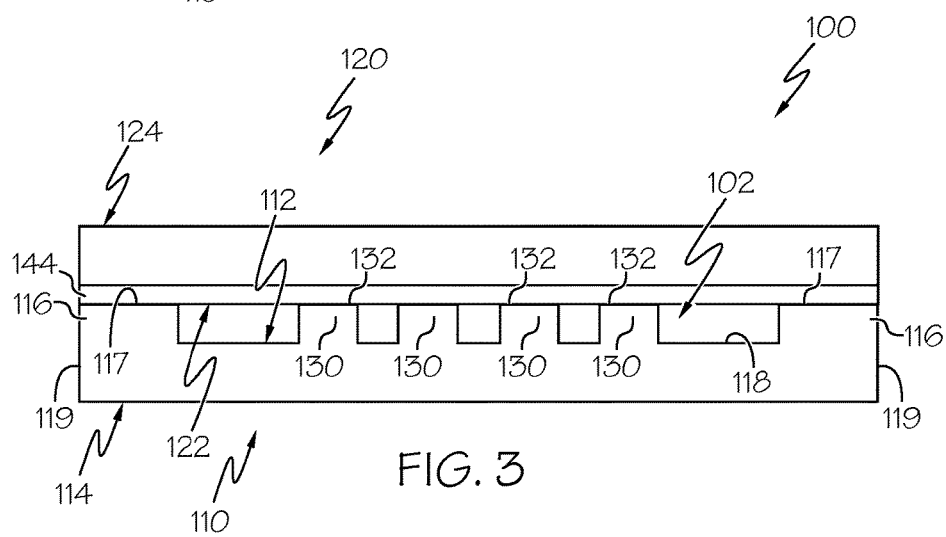
FIG. 3 is a schematic cross-sectional illustration of a vacuum insulated glass unit having a low-emissivity layer positioned between a first glass pane and a second glass pane, according to one or more embodiments shown and described herein.

Referring now to FIG. 3, the low-emissivity layer 144 may be positioned on the vacuum chamber side 112 of the first glass pane 110, the vacuum chamber side 122 of the second glass pane 120, or both. The low-emissivity layer 144 may comprise a tin oxide, such as indium tin oxide or fluorine doped tin oxide, silver, metallic silver, metallic nickel, silicon nitride, zirconium oxide, zinc oxide, gold oxide, or combinations thereof. The low-emissivity layer 144 is compositionally configured to reflect radiant heat and permit transmission of visible radiation upon exposure to solar radiation. Further, the low-emissivity layer 144 may be deposited on and engaged with the vacuum chamber side 112 of the first glass pane 110 and the vacuum chamber side 122 of the second glass pane 120 and may be used as the pane bonding layer 140 to hermetically seal the vacuum chamber 102. The low-emissivity layer 144 may be deposited using a sputtering process, mechanical deposition process, a manual deposition process, a chemical vapor deposition, a pyrolysis processes, a spray coating process, a photolithographic process, a screen printing process, a 3D printing process, an inkjet printing process, such as a piezoelectric inkjet printing process, or a combination thereof.

For example, the low-emissivity layer 144 may be compositionally configured to fuse upon absorption of radiation at wavelengths between about 300 nm and about 1600 nm, for example, between about 750 nm to about 1600 nm, between about 420 nm to about 750 nm, or the like, output by a bonding laser operating at between about 1 W and about 25 W, for example, between about 10 W and about 20 W and bond the first glass pane 110 to the second glass pane 120. The low-emissivity layer 144 may also be compositionally configured to bond the first glass pane 110 to the second glass pane 120 upon exposure to ultrasonic energy (e.g., ultrasonic energy between about 10 kHz and about 100 MHz) or upon exposure to heat, such as heat applied by a furnace at a temperature less than or equal to a softening temperature of soda lime glass, for example, between about 250° C. and about 750° C.

Referring now to FIGS. 4A-4G, a method of manufacturing the vacuum insulated glass unit 100 is schematically depicted. The method is depicted in FIGS. 4A-4G as comprising a number of steps, however, it should be understood that other non-depicted steps may be contemplated. While the steps of the method are described in a particular order, other orders are contemplated. Further, while FIGS. 4A-4G depict a method of manufacturing a planar vacuum insulated glass unit 100, the method may also be applied to the manufacture of a curved vacuum insulated glass unit comprising curved glass panes.

Figure 4A:
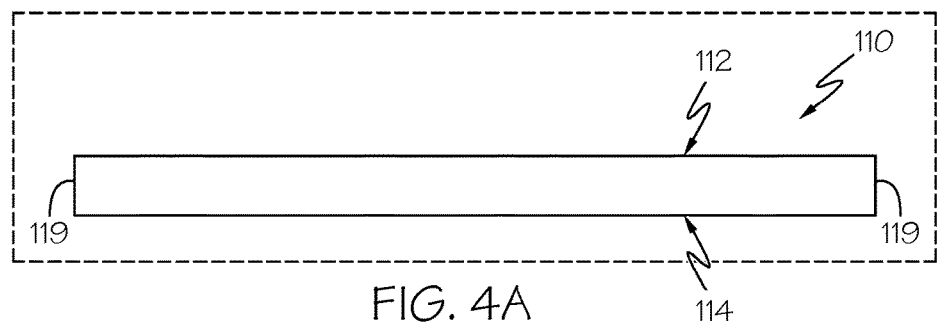
FIG. 4A is a schematic cross-sectional illustration of a first glass pane for use in a method of manufacturing the vacuum insulated glass units of FIGS. 1-3, according to one or more embodiments shown and described herein.
Figure 4B:
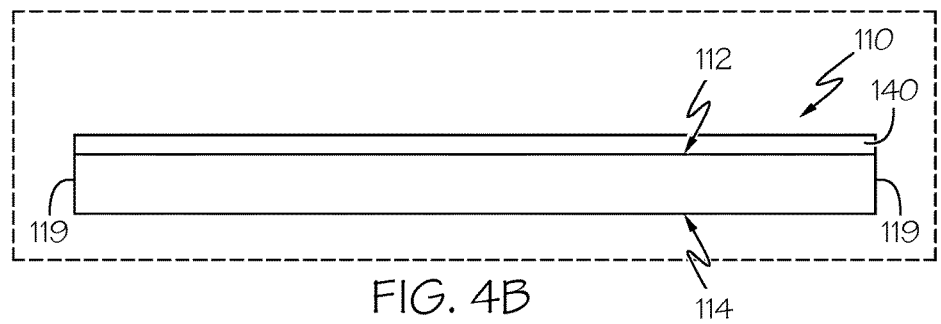
FIG. 4B is a schematic cross-sectional illustration of a pane bonding layer positioned on the first glass pane of FIG. 4A, according to one or more embodiments shown and described herein.

Referring now to FIGS. 4A and 4B, the method may first comprise depositing the pane bonding layer 140 onto the vacuum chamber side 112 of the first glass pane 110. The pane bonding layer 140 may be deposited onto the vacuum chamber side 112 of the first glass pane 110 using a sputtering process, mechanical deposition process, a manual deposition process, a chemical vapor deposition, a pyrolysis processes, a spray coating process, a photolithographic process, a screen printing process, a 3D printing process, an inkjet printing process, such as a piezoelectric inkjet printing process, or a combination thereof.

Figure 4C:
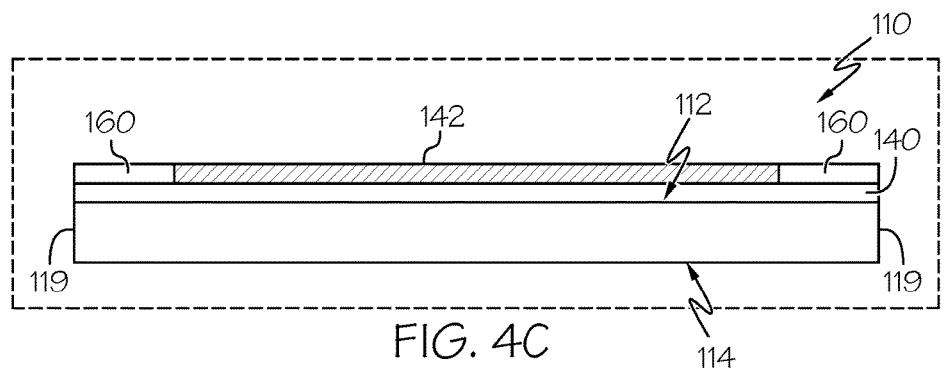
FIG. 4C is a schematic cross-sectional illustration of an anti-friction layer positioned on the first glass pane of FIG. 4A, according to one or more embodiments shown and described herein.

Referring now to FIG. 4C, the method may further comprise depositing an anti-friction mask layer 160 (e.g., a masking layer for blocking deposition of the anti-friction layer 142) along the perimeter 119 of the vacuum chamber side 112 of the first glass pane 110, for example, onto the portion of the pane bonding layer 140 positioned along the perimeter 119 of the first glass pane 110. The anti-friction mask layer 160 may comprise any material compositionally configured to block the anti-friction layer 142 from contacting and engaging the first and second glass panes 110, 120, for example, masking tape or other temporary masking adhesive, polysilicon, amorphous silicon, silicon carbide, titanium nitride, inkjet printed masks (e.g., acrylate n-vinylcaprolactam), acrylate polymers, or a combination thereof. The anti-friction mask layer 160 may be deposited using a mechanical deposition process, a manual deposition process, a chemical vapor deposition process, a photolithographic process, a screen printing process, a 3D printing process, an inkjet printing process, such as a piezoelectric inkjet printing process, or a combination thereof.

Next, referring still to FIG. 4C, the anti-friction layer 142 may be deposited onto the vacuum chamber side 112 of the first glass pane 110. The anti-friction layer 142 may be deposited using a mechanical deposition process, a manual deposition process, a chemical vapor deposition process, a photolithographic process, a screen printing process, a 3D printing process, an inkjet printing process, such as a piezoelectric inkjet printing process, or a combination thereof. The anti-friction layer 142 may be deposited onto the vacuum chamber side 112 of the first glass pane 110 at locations corresponding to the etched interior surface 118 and the plurality of glass spacers 130 of the manufactured vacuum insulated glass units 100 depicted in FIGS. 1-3, such that the end surfaces 132 of the plurality of glass spacers 130 may comprise the anti-friction layer 142 after the manufacturing process is completed. Further, by first depositing the anti-friction mask layer 160 along the perimeter 119 of the vacuum chamber side 112 of the first glass pane 110, the anti-friction layer 142 may be prevented from engaging with portions of the vacuum chamber side 112 positioned along the perimeter 119. This allows the pane bonding layer 140 to be positioned between the first and second glass panes 110, 120 without the anti-friction layer 142 separating the pane bonding layer 140 from the first and second panes 110, 120.

Figure 4D:
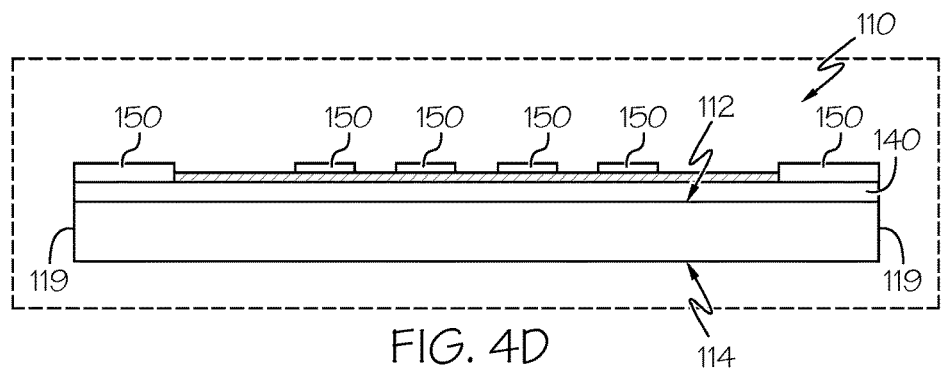
FIG. 4D is a schematic cross-sectional illustration of an etching mask layer positioned on the first glass pane of FIG. 4A, according to one or more embodiments shown and described herein.
Figure 4E:
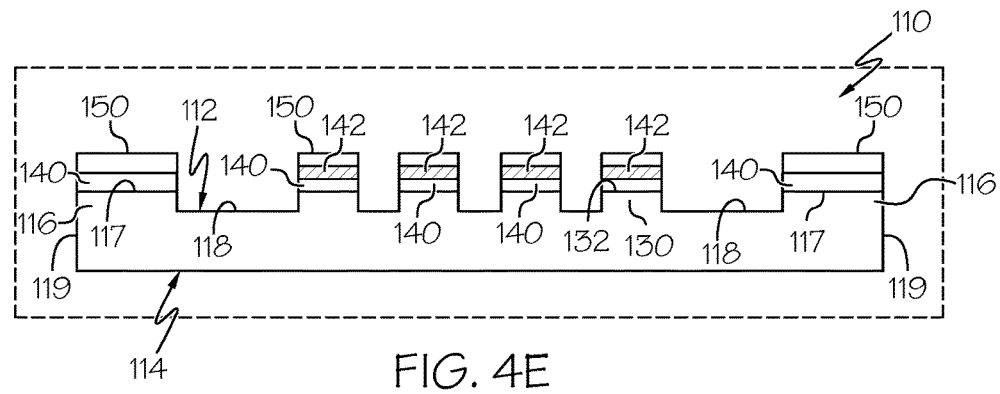
FIG. 4E is a schematic cross-sectional illustration of the first glass pane of FIGS. 4A-4D after contact with a chemical etchant, according to one or more embodiments shown and described herein.
Figure 4F:
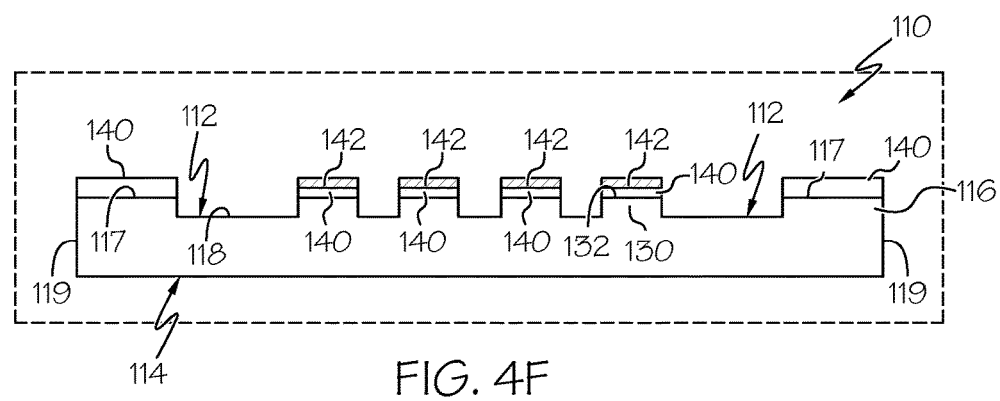
FIG. 4F is a schematic cross-sectional illustration of the chemically etched first glass pane of FIG. 4E after removal of the etching mask layer, according to one or more embodiments shown and described herein.
Figure 4G:
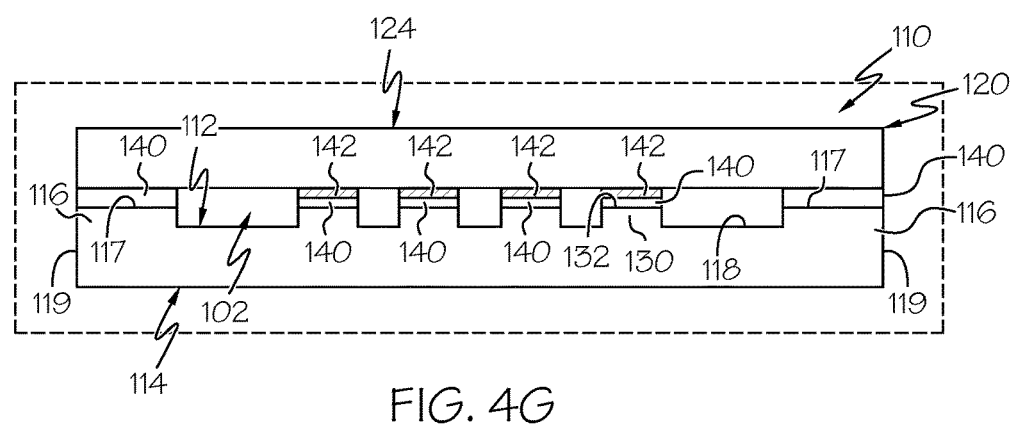
FIG. 4G is a schematic cross-sectional illustration of a second glass pane in contact with the chemically etched first glass pane of FIG. 4F, according to one or more embodiments shown and described herein.

Referring now to FIG. 4D, an etching mask layer 150 may be deposited onto a plurality of masking locations 152 along the vacuum chamber side 112 of the first glass pane 110 such that the pane bonding layer 140 is positioned between the first glass pane 110 and the etching mask layer 150. The etching mask layer 150 may comprise any material compositionally configured to block a chemical etchant from contacting the first and second glass panes 110, 120, for example, aluminum, polysilicon, amorphous silicon, silicon carbide, titanium nitride, inkjet printed masks (e.g., acrylate n-vinylcaprolactam), masking tape, acrylate polymers, or a combination thereof. In embodiments, etching mask layer 150 may also include ultraviolet (UV) or heat curable polymers. The etching mask layer 150 may be deposited using a mechanical deposition process, a manual deposition process, a chemical vapor deposition process, a photolithographic process, a screen printing process, a 3D printing process, an inkjet printing process, such as a piezoelectric inkjet printing process, or a combination thereof.

Figure 5:
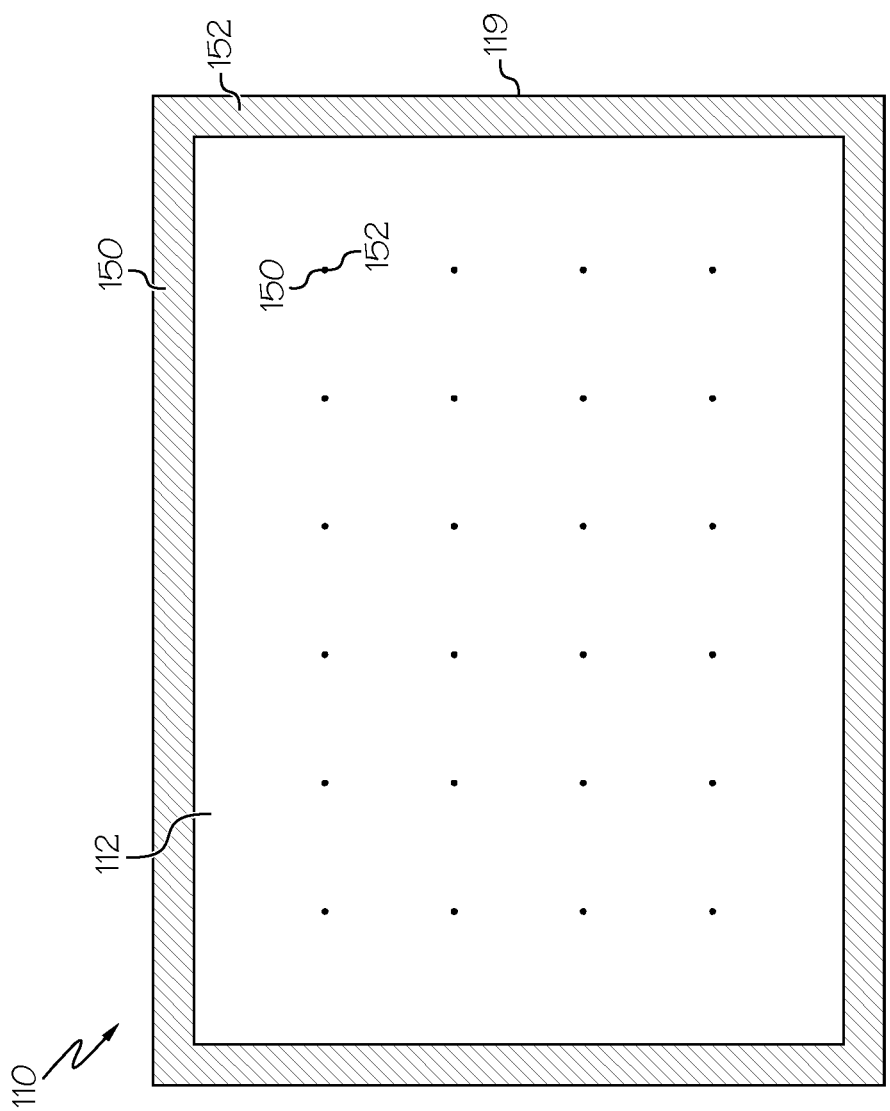
FIG. 5 is schematic illustration of a vacuum chamber side of a first glass pane having an etching mask layer positioned at a plurality of making locations, according to one or more embodiments shown and described herein.

Referring also to FIG. 5, the masking locations 152 may correspond to locations along the vacuum chamber side 122 where the end surfaces 132 of the plurality of glass spacers 130 and the periphery surface 117 of the glass pane periphery 116 are each desired. For example, the etching mask layer 150 may be deposited along the perimeter 119 of the first glass pane 110 and may be deposited at a number of discrete locations corresponding to the spacer array of the plurality of glass spacers 130. Further, the etching mask layer 150 and the anti-friction mask layer 160 may comprise the same masking material or may comprise different masking materials. When the etching mask layer 150 and the anti-friction mask layer 160 comprise the same material, the anti-friction mask layer 160 may not need to be removed before the etching mask layer 150 is deposited onto the plurality of masking locations 152. For example, the anti-friction mask layer 160 may remain along the perimeter 119 and the etching mask layer 150 may be deposited at the plurality of masking locations 152 corresponding with the desired locations of the end surfaces 132 of the plurality of glass spacers 130.

Referring now to FIG. 4E, the method of manufacturing the vacuum insulated glass unit 100 further comprises contacting the vacuum chamber side 112 of the first glass pane 110 with a chemical etchant to remove a depth of glass pane material, remove the anti-friction layer 142, and remove the pane bonding layer 140 from unmasked portions of the vacuum chamber side 112 of the first glass pane 110. The chemical etchant may comprise a wet chemical etchant such as hydrochloric acid (HCl), hydrofluoric acid (HF), ammonium fluoride ($NH_4F$), or a combination thereof. For example, the wet chemical etchant may comprise a mixture of between about 5 and 15 parts HF and 1 part HCl, for example about 10 parts HF and about 1 part HCl. In embodiments, the wet chemical etchant may comprise a mixture a mixture from about 10 weight precent (wt. %) to about 30 wt. % HF and from about 0 wt. % to about 10 wt. % HCl. Further, the chemical etchant may comprise a plasma chemical etchant comprising carbon tetrafluoride ($CF_4$), sulfur hexafluoride ($SF_6$), nitrogen trifluoride ($NF_3$), chlorine ($Cl_2$), dichlorodifluoromethane ($CCl_2F_2$), or a combination thereof. In embodiments, the chemical etchant is stirred or agitated (e.g., by sonication) when contacting the first glass pane 110.

Methods of manufacturing the vacuum insulated glass unit 100 may further comprise contacting the first glass pane with a fluid to reduce optical distortion through the first glass pane. In embodiments, contacting the first glass pane with the fluid to reduce optical distortion there through is completed after contacting the vacuum chamber side 112 of the first glass pane 110 with a chemical etchant. In embodiments, contacting the first glass pane with the fluid improves optical quality of etched glass pane 110 or increases visible light transmission through etched glass pane 110. The inventors have discovered that etching the first glass apne with a high concentration wet chemical etchant can diminish or distort the optical quality of or reduce visible light transmission through the glass pane. In embodiments, the fluid is configured to clean the etched surface of the glass pane or remove residual etched material from glass pane surface after the glass pane is contacted with a the chemical etchant. In embodiments, the fluid is a mineral acid. In embodiments, the fluid includes hydrochloric acid (HCl), nitric acid ($HNO_3$), sulfuric acid ($H_2SO_4$), or combinations thereof.

Further, during chemical etching, the chemical etchant may undercut the masking locations 152 during the etching process. To account for this undercut, the etching mask layer 150 may extend beyond the boundaries of the masking locations 152, for example, to cover a surface area between about 30% and about 70% larger than the surface area of the masking locations 152. Positioning the etching mask layer 150 beyond the boundaries of the masking locations 152 facilitates formation of the plurality of glass spacers 130 comprising end surfaces 132 with a desired surface area and the formation of the glass pane periphery 116 comprising the periphery surface 117 with a desired surface area when the chemical etchant undercuts the etching mask layer 150.

It is contemplated that an individual chemical etchant may be compositionally configured to remove each of the anti-friction layer 142, the pane bonding layer 140, and a depth of glass pane material. Moreover, it is also contemplated that multiple chemical etchants may be used to remove each of the anti-friction layer 142, the pane bonding layer 140, and a depth of glass pane material. For example, the method may comprise contacting the vacuum chamber side 112 with a first chemical etchant compositionally configured to remove the anti-friction layer 142 from unmasked portions of the vacuum chamber side 112 of the first glass pane 110 and contacting the vacuum chamber side 112 of the first glass pane 110 with a second chemical etchant compositionally configured to remove the pane bonding layer 140 from unmasked portions of the vacuum chamber side 112 of the first glass pane 110. Further, the method may comprise contacting the vacuum chamber side 112 of the first glass pane 110 with a third chemical etchant compositionally configured to remove a depth of glass pane material from unmasked portions of the vacuum chamber side 112 of the first glass pane 110.

As depicted in FIGS. 4E and 4F, after the chemical etchant contacts the unmasked portions of the vacuum chamber side 112 and a depth of glass pane material has been removed from unmasked portions of the vacuum chamber side 112, the unmasked portions of the vacuum chamber side 112 comprise the etched interior surface 118 and the masked portions (e.g., the masking locations 152 depicted in FIG. 5) extend from the etched interior surface 118 and comprise the glass pane periphery 116 and the plurality of glass spacers 130. After etching, the pane bonding layer 140 may be positioned on the periphery surface 117 of the glass pane periphery 116 and one or both of the pane bonding layer 140 and the anti-friction layer 142 may be positioned on the end surfaces 132 of the plurality of glass spacers 130. Next, the etching mask layer 150 may be removed. In embodiments, removing the etching mask layer 150 may include contacting the etching mask layer 150 with a fluid (e.g., water) to detach the etching mask layer 150 from the glass pane.

Referring now to FIG. 4G, the method of manufacturing the vacuum insulated glass unit 100 may further comprise positioning a second glass pane 120 in contact with the pane bonding layer 140 positioned on the periphery surface 117 of the first glass pane 110 and irradiating the pane bonding layer 140 positioned on the periphery surface 117 with a bonding laser to fuse the pane bonding layer 140 and seal the first glass pane 110 to the second glass pane 120. The method may further comprise translating the bonding laser such that a contact point of the laser radiation output by the bonding laser translates along the perimeter 119 of the first glass pane 110 to fuse the pane bonding layer 140 and seal the first glass pane 110 to the second glass pane 120 along the entire perimeter 119. For example, the bonding laser may be translated along the perimeter 119 at a rate of between about 1 mm/s and about 400 mm/s. Alternatively, the first glass pane 110 may be bonded to the second glass pane 120 according to the bonding laser methods provided in U.S. Patent Publication No. 2015/0027168 the entire content of which is incorporated by reference herein. Further, the anti-friction layer 142 may also be deposited on the vacuum chamber side 122 of the second glass pane 120, for example, before the second glass pane 120 is bonded to the first glass pane 110. When the anti-friction layer 142 is deposited on the vacuum chamber side 122 of the second glass pane 120, the anti-friction layer 142 may be transparent.

Once the first glass pane 110 is sealed to the second glass pane 120, gas may be removed from the vacuum chamber 102 located between the first glass pane 110 and the second glass pane 120 such that the vacuum chamber 102 comprises a pressure below atmospheric pressure to generate a vacuum within the vacuum chamber 102. Gas may be removed from the vacuum chamber 102 using gas removal systems and methods of which may be learned from conventional or yet-to-be developed teachings related to vacuum generation and vacuum chamber evacuation, for example, the vacuum chamber evacuation methods provided in U.S. Provisional Patent Application No. 62/248,661 filed Oct. 30, 2015 entitled "VACUUM INSULATED GLASS UNIT AND PUMPING SYSTEM AND METHODOLOGY FOR EVACUATING THE SAME" the entire contents of which is incorporate by reference herein.

The method of manufacturing the vacuum insulated glass unit 100 may also comprise tempering one or both of the vacuum chamber side 112, 122 and the outer side 114, 124 of one or both of the first glass pane 110 and the second glass pane 120, for example, by heat tempering the first and/or second glass panes 110, 120, chemically tempering the first and/or second glass panes 110, 120, or using other tempering methods. The first and second glass panes 110, 120 may be tempered before or after the first glass pane 110 is sealed to the second glass pane 120. In an exemplary embodiment, when the first and second glass panes 110 are tempered before they are sealed together, irradiating the pane bonding layer 140 with the bonding laser to fuse the pane bonding layer 140 does not alter the tempering of the first and second glass panes 110, 120 because the bonding laser generates localized heating of the pane bonding layer 140 along the perimeter 119.

As depicted in FIG. 3, the low-emissivity layer 144 may be used to seal the first glass pane 110 to the second glass pane 120. Referring also to FIGS. 4A-4G, in another method of manufacturing the vacuum insulated glass unit 100, the pane bonding layer 140 may not need to be deposited onto the vacuum chamber side 112 and an example second glass pane 120 comprising the low-emissivity layer 144 may bond with the periphery surface 117 of the first glass pane 110 to seal the first glass pane 110 to the second glass pane 120. The alternative method may also include positioning the anti-friction mask layer 160 along the perimeter 119 of the vacuum chamber side 112 of the first glass pane 110 then depositing the anti-friction layer 142 on the vacuum chamber side 112. Next, the etching mask layer 150 may be deposited onto the plurality of masking locations 152 along the vacuum chamber side 112 of the first glass pane 110. The vacuum chamber side 112 of the first glass pane 110 may then be contacted with a chemical etchant, for example, the one or more chemical etchants described above, to remove a depth of glass pane material from unmasked portions of the vacuum chamber side 112 of the first glass pane 110, such that the vacuum chamber side 112 of the first glass pane 110 comprises the etched interior surface 118, the glass pane periphery 116, and the plurality of glass spacers 130. The etching mask layer 150 may then be removed.

Next, the second glass pane 120 having the low-emissivity layer 144 located on the vacuum chamber side 122 of may be positioned in contact with the periphery surface 117 of the glass pane periphery 116 of the first glass pane 110. The portion of the low-emissivity layer 144 of the second glass pane 120 contacting the periphery surface 117 of the first glass pane 110 may be irradiated with a bonding laser to fuse the portions of the low-emissivity layer 144 contacting the glass pane periphery 116 to seal the first glass pane 110 to the second glass pane 120. The bonding laser may be translated such that a contact point (or contact area) of the laser radiation output by the bonding laser translates along the perimeter 119 of the first glass pane 110 to fuse the low-emissivity layer 144 and seal the first glass pane 110 to the second glass pane 120 along the entire perimeter 119.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the term "about" is utilized herein to represent the inherent degree of uncertainty that may be attributed to any quantitative comparison, value, measurement, or other representation. The term "about" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

It is noted that, while methods are described herein as following a specific sequence, additional embodiments of the present disclosure are not limited to any particular sequence.

The invention claimed is:

1. A method of manufacturing a vacuum insulated glass unit, the method comprising:
   depositing a pane bonding layer onto a vacuum chamber side of a first glass pane;
   depositing an etching mask layer onto a plurality of masking locations along the vacuum chamber side of the first glass pane such that the pane bonding layer is positioned between the first glass pane and the etching mask layer;
   contacting the vacuum chamber side of the first glass pane with a chemical etchant to remove a depth of glass pane material and remove the pane bonding layer from unmasked portions of the vacuum chamber side of the first glass pane, such that the vacuum chamber side of the first glass pane comprises an etched interior surface, a glass pane periphery, and a plurality of glass spacers, wherein
   the plurality of glass spacers and the glass pane periphery extend from the etched interior surface, and
   the pane bonding layer is positioned on the glass pane periphery;
   removing the etching mask layer; and
   bonding a second glass pane with the pane bonding layer positioned on the glass pane periphery of the first glass pane;
      depositing an anti-friction mask layer along a perimeter of the vacuum chamber side of the first glass pane; and
      depositing an anti-friction layer onto the vacuum chamber side of the first glass pane before depositing the etching mask layer onto the plurality of masking locations such that after contacting the vacuum chamber side of the first glass pane with the chemical etchant, the end surfaces of the plurality of glass spacers comprise the anti-friction layer.

2. The method of manufacturing the vacuum insulated glass unit of claim 1, the method further comprising irradiating the pane bonding layer with a bonding laser to fuse the pane bonding layer and seal the first glass pane to the second glass pane.

3. The method of manufacturing the vacuum insulated glass unit of claim 2, the method further comprising translating the bonding laser such that a contact point of laser radiation output by the bonding laser translates along a perimeter of the first glass pane at a rate of between about 1 mm/s and about 400 mm/s.

4. The method of manufacturing the vacuum insulated glass unit of claim 1, wherein the pane bonding layer is deposited onto the of the first glass pane using a sputtering process, mechanical deposition process, a manual deposition process, a chemical vapor deposition, a pyrolysis processes, a spray coating process, a photolithographic process, a screen printing process, an inkjet printing process, a 3D printing process, or a combination thereof.

5. The method of manufacturing the vacuum insulated glass unit of claim 1, the method further comprising removing gas from a vacuum chamber positioned between the first glass pane and the second glass pane to generate a vacuum within the vacuum chamber.

6. The method of manufacturing the vacuum insulated glass unit of claim 1, wherein the etching mask layer comprises aluminum, polysilicon, amorphous silicon, silicon carbide, titanium nitride, acrylate polymers, or a combination thereof.

7. The method of manufacturing the vacuum insulated glass unit of claim 1, wherein the etching mask layer is deposited using a chemical vapor deposition process, a photolithographic process, a screen printing process, an inkjet printing process, or a combination thereof.

8. The method of manufacturing the vacuum insulated glass unit of claim 1, wherein the anti-friction mask layer comprises aluminum, polysilicon, amorphous silicon, silicon carbide, titanium nitride, or a combination thereof and is deposited using a chemical vapor deposition process, a photolithographic process, a screen printing process, an inkjet printing process, or a combination thereof.

9. The method of manufacturing the vacuum insulated glass unit of claim 1, the method further comprising:
   contacting the vacuum chamber side of the first glass pane with a first chemical etchant compositionally configured to remove the anti-friction layer from unmasked portions of the vacuum chamber side of the first glass pane; and
   contacting the vacuum chamber side of the first glass pane with a second chemical etchant compositionally configured to remove the pane bonding layer from unmasked portions of the vacuum chamber side of the first glass pane.

10. The method of manufacturing the vacuum insulated glass unit of claim 9, the method further comprising contacting the vacuum chamber side of the first glass pane with a third chemical etchant compositionally configured to remove the depth of glass pane material from unmasked portions of the vacuum chamber side of the first glass pane.

11. The method of manufacturing the vacuum insulated glass unit of claim 1, wherein the chemical etchant comprises a wet chemical etchant comprising hydrochloric acid (HCl), hydrofluoric acid (HF), ammonium fluoride ($NH_4F$), or a combination thereof.

12. The method of manufacturing the vacuum insulated glass unit of claim 11, wherein the wet chemical etchant comprises a mixture from about 10 wt. % to about 30 wt. % HF and from about 0 wt. % to about 10 wt. % HCl.

13. The method of manufacturing the vacuum insulated glass unit of claim 1, further comprising contacting the vacuum chamber side of the first glass pane with a fluid to reduce optical distortion through the first glass pane.

* * * * *